United States Patent
Kim et al.

(10) Patent No.: US 12,261,261 B2
(45) Date of Patent: Mar. 25, 2025

(54) POUCHED-TYPE SECONDARY BATTERY PACKAGING EQUIPMENT

(71) Applicant: LG ELECTRONICS INC., Seoul (KR)

(72) Inventors: Jinwoo Kim, Seoul (KR); Taeyong Kim, Seoul (KR); Hankwon Jung, Seoul (KR); Seungjin Shin, Seoul (KR); Heejeong Nam, Seoul (KR); Jongwon Kwak, Seoul (KR); Seongho Lee, Seoul (KR); Dongho Park, Seoul (KR); Hyunik Son, Seoul (KR); Chimin Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 17/927,262

(22) PCT Filed: May 22, 2020

(86) PCT No.: PCT/KR2020/006733
§ 371 (c)(1),
(2) Date: Nov. 22, 2022

(87) PCT Pub. No.: WO2021/235580
PCT Pub. Date: Nov. 25, 2021

(65) Prior Publication Data
US 2023/0207857 A1 Jun. 29, 2023

(51) Int. Cl.
*H01M 10/04* (2006.01)
*B25J 11/00* (2006.01)
(Continued)

(52) U.S. Cl.
CPC ....... *H01M 10/0404* (2013.01); *B25J 11/005* (2013.01); *G06K 7/1413* (2013.01); *H01M 50/105* (2021.01)

(58) Field of Classification Search
CPC .................................................. H01M 10/0404
See application file for complete search history.

(56) References Cited

U.S. PATENT DOCUMENTS

2002/0157241 A1* 10/2002 Yamamoto ............ B23P 21/004
29/784
2014/0138213 A1* 5/2014 Magni .................... B65G 17/12
198/464.1
(Continued)

FOREIGN PATENT DOCUMENTS

CN 108110203 A * 6/2018 ........ H01M 10/0404
CN 111063903 A 4/2020
(Continued)

OTHER PUBLICATIONS

Machine translation of KR10-2017-0062401-A (Year: 2017).*
(Continued)

*Primary Examiner* — Kyle A Cook
(74) *Attorney, Agent, or Firm* — Birch, Stewart, Kolasch & Birch, LLP (57) ABSTRACT

The present embodiment comprises: a pallet on which a cell assembly, in which a cell is accommodated inside a pouch, is placed; a pallet rail along which the pallet is guided; a marking printer which forms a mark on the cell assembly placed on the pallet; a mark reader which reads the mark generated by the marking printer; a first meter which measures a weight of the cell assembly; an injector which has an (Continued)

injection nozzle injecting an electrolyte into the pouch of the cell assembly; a second meter which measures a weight of the cell assembly having the electrolyte injected thereinto; and a sealing unit which seals the pouch and has a vacuum chamber into which the cell assembly is inserted.

4 Claims, 7 Drawing Sheets

(51) Int. Cl.
*G06K 7/14* (2006.01)
*H01M 50/105* (2021.01)

(56) References Cited

U.S. PATENT DOCUMENTS

| | | | |
|---|---|---|---|
| 2018/0074130 A1 | 3/2018 | Jeung et al. | |
| 2023/0160967 A1* | 5/2023 | Huh | G01R 31/3865 29/705 |

FOREIGN PATENT DOCUMENTS

| | | | | |
|---|---|---|---|---|
| JP | 2017-178585 A | | 10/2017 | |
| JP | 6595389 B2 | | 10/2019 | |
| KR | 10-2011-0133927 A | | 12/2011 | |
| KR | 101121094 B1 | * | 3/2012 | ........ H01M 10/0404 |
| KR | 10-2016-0143068 A | | 12/2016 | |
| KR | 20170041538 A | * | 4/2017 | ............. Y02E 60/10 |
| KR | 10-2017-0062401 A | | 6/2017 | |
| KR | 10-2018-0049449 A | | 5/2018 | |
| KR | 10-2018-0095982 A | | 8/2018 | |
| KR | 10-1937995 B1 | | 1/2019 | |
| KR | 10-1988138 B1 | | 6/2019 | |
| KR | 20190089369 A | * | 7/2019 | ............. G01B 15/00 |

OTHER PUBLICATIONS

Machine translation of KR-101121094-B1 (Year: 2012).*
Machine translation of KR-20190089369-A (Year: 2019).*
The KBH Company, Pallet Circulation Conveyor, Screen shot taken on Aug. 22, 2018, available at https://www.kbh-automation.com/pallet-circulation-conveyor.html (Year: 2018).*
Aktivit, The Pallet Circulating Conveyor With Steel Chain, Screen shot taken on Nov. 2, 2017, available at https://www.aktivit.cz/the-pallet-circulating-conveyor-with-steel-chain (Year: 2017).*
Marking primary packaging is taught by Weber Labeling & Coding Solutions, Marking packaging alongside the production line, Published Aug. 22, 2019, available at https://www.weber-marking.com/blog/marking-packaging-alongside-the-production-line/ (Year: 2019).*
Machine translation of KR-20170041538-A (Year: 2017).*
Omron Automation, The importance of label verification in automotive manufacturing, Published on Mar. 23, 2020, available at https://automation.omron.com/en/us/blog/label-verification-automotive-manufacturing (Year: 2020).*
Machine translation of CN-108110203-A (Year: 2018).*

* cited by examiner

POUCHED-TYPE SECONDARY BATTERY PACKAGING EQUIPMENT

CROSS REFERENCE TO RELATED APPLICATION

This application is the National Phase of PCT International Application No. PCT/KR2020/006733, filed on May 22, 2020, which is hereby expressly incorporated by reference into the present application.

TECHNICAL FIELD

The present invention relates to pouched-type secondary battery packaging equipment.

BACKGROUND ART

A secondary battery is a device that converts electrical energy into chemical energy to store the converted energy, thereby generating electricity as necessary. Here, both charging and discharging occur at one electrode, and an anode (negative pole) and a cathode (positive pole) are distinguished on the basis of a discharge reaction.

A secondary battery includes positive and negative electrode plates coated with an active material on a collector, a separator separating the positive electrode plate from the negative electrode plate, an electrolyte transferring ions through the separator, a case accommodating the positive electrode plate, the separator, and the negative electrode plate, and a lead tab connected to each of the positive electrode plate and the negative electrode plate so as to be drawn out.

The secondary battery may be classified into a cylindrical type, a prismatic type, and a pouched type according to its shape.

The pouched-type secondary battery may include a case such as a pouch having flexibility and thus may be relatively free in shape, a manufacturing process is relatively easy, and a manufacturing cost is low, and as a result, the pouched-type secondary battery is widely used in the secondary battery industry.

Examples of the pouched-type secondary battery include a pouched-type secondary battery, in which a thermally expandable layer disclosed in Korean Patent Publication No. 10-2018-0095982 A (published on Aug. 29, 2018) is introduced, and such a pouched-type secondary battery includes an electrode collector, which includes a positive electrode, a negative electrode, and a separator, and a pouch surrounding the electrode collector.

Equipment for manufacturing a pouched-type secondary battery may assembly a pouch and an electrode collector so that the pouch having a predetermined shape surrounds the electrode collector, and at this time, the equipment may include a sealer (or sealing device), which seals the pouch surrounding the electrode collector, and the like, and the pouch may be moved to the sealer to be sealed by the sealer.

DISCLOSURE OF THE INVENTION

Technical Problem

An object of the present invention is to provide pouched-type secondary battery packaging equipment in which a plurality of processes are sequentially performed while a cell assembly is moved in a state of being placed on a pallet.

Another object of the present invention is to provide a pouched-type secondary battery packaging equipment capable of minimizing a jig for transferring a cell assembly.

Technical Solution

Pouched-type secondary battery packaging equipment according to an embodiment of the present invention includes a pallet on which a cell assembly, in which a cell is accommodated inside a pouch, is placed, a pallet rail along which the pallet is guided, a marking printer configured to generate a mark on the cell assembly placed on the pallet, a mark reader configured to read the mark generated by the marking printer, a first meter configured to measure a weight of the cell assembly, an injector provided with an injection nozzle configured to inject an electrolyte into the pouch of the cell assembly, a second meter configured to measure a weight of the cell assembly having the electrolyte injected thereinto, and a sealing unit provided with a vacuum chamber, into which the cell assembly is put, and configured to seal the pouch.

The pouched-type secondary battery packaging equipment may further include a worktable on which the pallet rail is disposed, The pallet rail may be disposed to be elongated in a longitudinal direction of the worktable.

The pallet rail may include first and second rails parallel to each other, a third rail configured to connect one end of the first rail to one end of the second rail, and a fourth rail configured to connect the other end of the first rail to the other end of the second rail.

Each of a length of the first rail and a length of the second rail may be greater than each of a length of the third rail and a length of the fourth rail.

The marking printer, the mark reader, the first meter, the injector, the second meter, and the sealing unit may be sequentially disposed along the pallet rail.

The marking printer, the mark reader, the first meter, the injector, the second meter, and the sealing unit may be disposed in a line along the first rail.

The pouched-type secondary battery packaging equipment may further include an inspector configured to inspect the cell assembly sealed by the sealing unit.

The inspector may include an IR checker configured to measure failure of the cell assembly, and an inspector reader configured to read the mark of the cell assembly.

The pouched-type secondary battery packaging equipment may further include a loading robot configured to lift the cell assembly to be seated on the pallet.

The loading robot may be configured to lift the cell assembly to the pallet disposed behind the marking printer.

The pouched-type secondary battery packaging equipment may further include an unloading robot configured to lift and unload the cell assembly.

The unloading robot may be configured to unload the cell assembly from the pallet passing through the inspector.

Advantageous Effects

According to the embodiment of the present invention, since the cell assembly sequentially is moved to the position for each process in the state of being placed on the pallet, the jig for transferring the cell assembly may be minimized.

In addition, since the marking printer, the mark reader, the first meter, the injector, the second meter, and the sealing unit are sequentially arranged, the operator may be easily accessible to each of the marking printer, the mark reader, the first meter, the injector, the second meter, and the sealing unit, and the maintenance or service thereof may be easy.

In addition, other components for the additional process may be easily additionally mounted between the marking printer and the mark reader, between the mark reader and the first meter, between the first meter and the injector, between the injector and the second meter, and between the second meter and the sealing unit and also may be continuously used without being limited by the number of processes.

MODE FOR CARRYING OUT THE INVENTION

Hereinafter, detailed embodiments will be described in detail with reference to the accompanying drawings.

Figure 1:
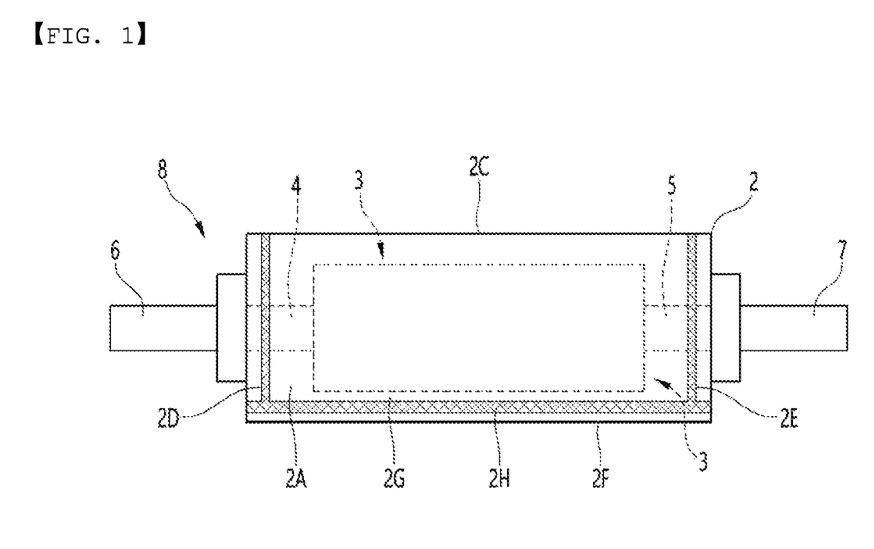
FIG. 1 is a view illustrating a pouched-type secondary battery manufactured by pouched-type secondary battery packaging equipment according to an embodiment of the present invention.
Figure 2:
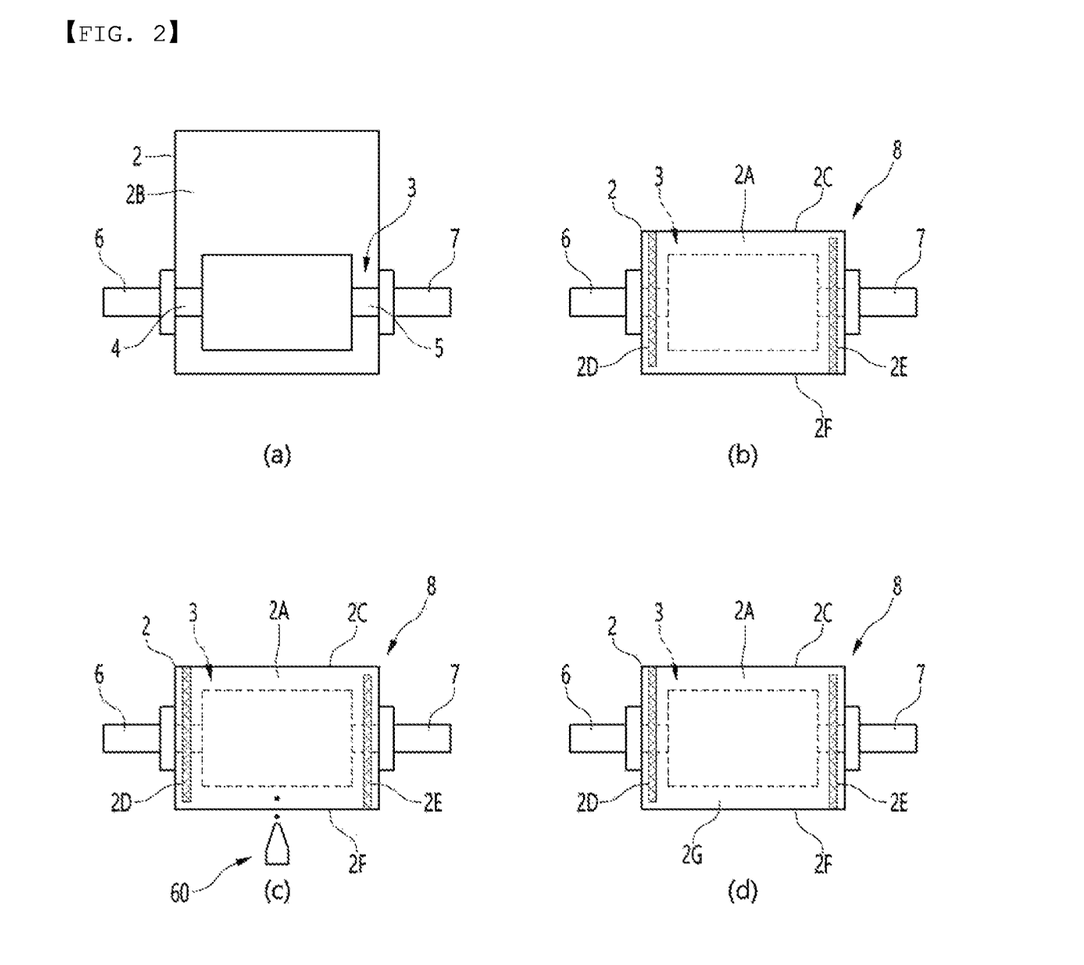
FIG. 2 is a view illustrating a process of manufacturing a pouched-type secondary battery by pouched-type secondary battery packaging equipment according to an embodiment of the present invention.
Figure 3:
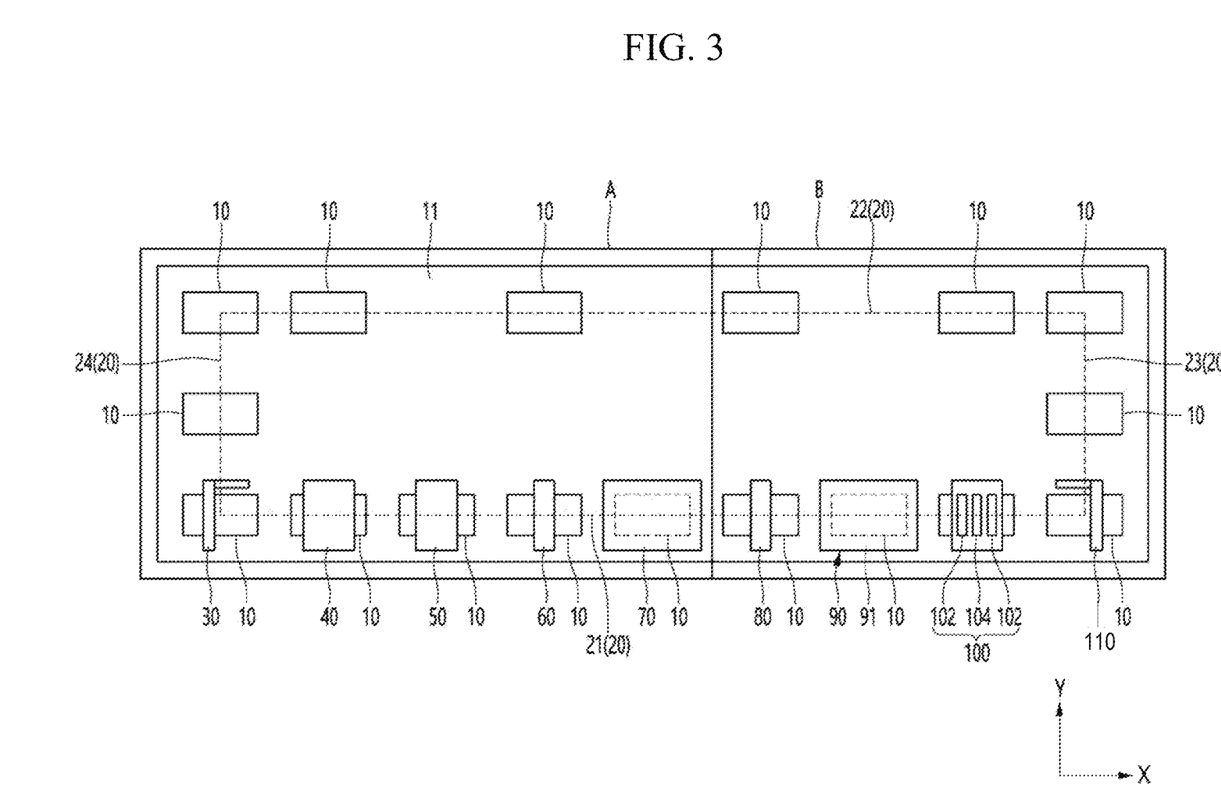
FIG. 3 is a schematic view illustrating a configuration of pouched-type secondary battery packaging equipment according to an embodiment of the present invention.

FIG. 1 is a view illustrating a pouched-type secondary battery manufactured by pouched-type secondary battery packaging equipment according to an embodiment of the present invention, FIG. 2 is a view illustrating a process of manufacturing a pouched-type secondary battery by pouched-type secondary battery packaging equipment according to an embodiment of the present invention, and FIG. 3 is a schematic view illustrating a configuration of pouched-type secondary battery packaging equipment according to an embodiment of the present invention.

A pouched-type secondary battery may include a pouch 2 and a cell 3 surrounded by the pouch 2, and the cell 3 may be protected by the pouch 2.

An example of the pouch 2 may include an aluminum pouch 2A and a bonding layer 2B disposed on one surface of the aluminum pouch 2A.

The pouch 2 may be cut into rectangular unit pouches outside pouched-type secondary battery packaging equipment illustrated in FIG. 3, and hereinafter, each of the unit pouches will be referred to as a pouch 2.

The cell 3 may include an electrode plate assembly (or stacked cell) in which a plurality of electrode plates are stacked, and in the electrode plate assembly, a separator may be disposed between a pair of electrode plates adjacent to each other.

As illustrated in (a) of FIG. 2, the electrode plate assembly may be provided with a positive electrode tab 4 and a negative electrode tab 5. The positive electrode tab 4 and the negative electrode tab 5 may be connected to electrode plates different from each other, respectively.

As illustrated in (a) of FIG. 2, the positive electrode 6 may be bonded to the positive electrode tab 4 of the cell 3 by welding or the like, and the negative electrode 7 may be bonded to the negative electrode tab 5 of the cell 3 by welding or the like. In the state in which the positive electrode 6 is bonded to the positive electrode tab 4, and the negative electrode 7 is bonded to the negative electrode tab 5, as illustrated in (a) of FIG. 2, the cell 3 may be placed on the pouch 2, in particular, on the bonding layer 2B.

The pouch 2 may be folded to cover both surfaces of the cell 3 outside the pouched-type secondary battery packaging equipment illustrated in FIG. 3. When the pouch 2 is folded to cover both the surfaces of the cell 3, as illustrated in (b) of FIG. 2, the pouch 2 may include a folding line 2C, and also, the pouch 2 may include a lower pouch on which the cell 3 is seated and an upper pouch covering a top surface of the cell 3. The lower pouch and the upper pouch may be provided with sealing portions 2D and 2E on which a portion, at which the positive electrode tab 4 is disposed, and a portion, at which the negative electrode tab 5 is disposed, among four edges are bonded to each other, and the sealing portions 2D and 2E may be provided through a first sealing process. When the first sealing process is completed, the pouch 2 and the cell 3 may be a cell assembly 8 in which the positive electrode 6 and the negative electrode 7 are bonded as illustrated in (b) of FIG. 2.

When the sealing process is completed, an opposite side 2F of the folding line 2C of the pouch 2 may be opened, the cell assembly 8 may be put into the pouched-type secondary battery packaging equipment, and the pouched-type secondary battery may perform subsequent processes.

As illustrated in (c) of FIG. 2, the pouched-type secondary battery packaging equipment may perform a process (hereinafter, referred to as an electrolyte injection process) of injecting an electrolyte EL into the pouch 2 through the opposite side 2F of the folding line of the pouch 2 and a second sealing process of sealing the cell assembly 8 in which the injection of the electrolyte El is completed.

The electrolyte injection process may be a process in which an injector 70 (see FIGS. 4 and 5) injects the electrolyte through an opposite side of the folding line 2C in the lower pouch and an opposite side of the folding line 2C in the upper pouch.

The electrolyte injection process may be performed before the second sealing process, and the electrolyte injection process and the second sealing process may be sequentially performed with a time difference by the pouched-type secondary battery packaging equipment.

The second sealing process may be a sealing process of bonding a peripheral portion 2G (see (d) of FIG. 2) of the opposite side 2F the folding line 2C of the pouch 2. As illustrated in FIG. 1, a sealing portion 2H (see FIG. 1) that seals the peripheral portion 2G of the opposite side 2F of the folding line 2C may be disposed on the pouch 2, and a sealed space may be defined between the lower pouch and the upper pouch.

The sealing portions 2D and 2E on which the portion, at which the positive electrode tab 4 is disposed, and the portion, at which the negative electrode tab 5 is disposed, of the pouch 2 are respectively bonded may be side sealing portions, and the sealing portion 2H that seals the peripheral portion 2G of the opposite side 2F of the folding line 2C of the pouch 2 may be an end sealing portion.

The end sealing portion 2H may be configured to connect the pair of side sealing portions 2D and 2E at the opposite side of the folding line 2C, and a sealed space, into which the electrode assembly is accommodated, and the injection of the electrolyte is completed, may be defined between the portion, at which the folding line 2C is disposed, the pair of side sealing portions 2D and 2E, and the end sealing portion 2H.

The first sealing process may be a pre-sealing process performed before the second sealing process, and the second sealing process performed by the pouched-type secondary battery packaging equipment may be a post-sealing process performed after the pre-sealing process.

The first sealing process may be a pre sealing process performed before the second sealing process, and the second sealing process performed by the pouched-type secondary battery packaging equipment may be a main sealing process performed after the pre-sealing process.

The first sealing process may be a top sealing process performed before the second sealing process, and the second sealing process performed by the pouched-type secondary battery packaging equipment may be a V sealing process performed after the top sealing process.

The second sealing process may be a process of forming the end sealing portion 2H in a vacuum state and will be hereinafter referred to as a vacuum sealing process.

The pouched-type secondary battery packaging equipment may perform an electrolyte injection process and a vacuum sealing process while moving the cell assembly 8 as illustrated in (b) of FIG. 2. Here, when the electrolyte injection process is completed by the injector 70 (see (c) of FIG. 2), it may be as illustrated in (d) of FIG. 2, and when the vacuum sealing process is completed, the end sealing portion 2H may be provided as illustrated in FIG. 1.

Referring to FIG. 3, the pouched-type secondary battery packaging equipment may include a pallet 10 and a pallet rail 20 on which the pallet 10 is guided.

The cell assembly 8 in which the cell 3 is accommodated in the pouch 2 may be placed on the pallet 10.

The cell assembly 8 placed on the pallet 10 may be an unfinished cell assembly, and as illustrated in (b) of FIG. 2, the cell assembly 8 in which the side sealing portions are provided, and the end sealing portion 2H is not provided may be placed on the pallet 10.

At least one cell assembly 8 may be placed on the pallet 10, for example, a pair of cell assemblies 8 may be disposed together on the pallet 10.

The pallet 10 may be a carrier that carries the cell assembly 8.

The pouched-type secondary battery packaging equipment may include a plurality of pallets 10, and the plurality of pallets 10 may be disposed together on the pallet rail 20.

The pouched-type secondary battery packaging equipment may further include a worktable 11 on which the pallet rail 20 is disposed.

The worktable 11 may be configured as a combination of a plurality of tables, and in this case, a plurality of rails may be arranged in a line.

The pallet rail 20 may be disposed to be elongated in a longitudinal direction X of the worktable 11 as a whole.

The pallet rail 20 may include a first rail 21 and a second rail 22, which are parallel to each other, a third rail 23 connecting one end of the first rail 21 to one end of the second rail 22, and a fourth rail 24 connecting the other end of the first rail 21 to the other end of the second rail 22.

The pallet rail 20 may be provided as a circulation track, and the pallets 10 may be circulated along the pallet rail 20. The pallet 10 may be sequentially guided by the first rail 21, the third rail 23, the second rail 22, and the fourth rail 24, and then be guided to the first rail 21 again.

Each of the first rail 21 and the second rail 22 may have a linear shape, and each of the third rail 23 and the fourth rail 24 may have a linear shape or a curved shape.

The first rail 21 and the second rail 22 may be spaced apart from each other, and the first rail 21 and the second rail 22 may be spaced apart from each other in a direction Y orthogonal to the longitudinal direction X of each of the first rail 21 and the second rail 22.

The third rail 23 and the fourth rail 24 may be spaced apart from each other, and the first rail 21 and the second rail 22 may be spaced apart from each other in the longitudinal direction X of each of the first rail 22 and the second rail 22.

Each of a length of the first rail 21 and a length of the second rail 22 may be greater than each of a length of the third rail 23 and a length of the fourth rail 24.

The pouched-type secondary battery packaging equipment may sequentially perform various processes on the cell assembly 8 while the pallet 20 is moved along the first rail 21. The first rail 21 may be a work rail that guides the pallet 10 while the pouched-type secondary battery packaging equipment performs the various processes on the cell assembly 8.

The second rail 22, the third rail 23, and the fourth rail 24 may be return rails that guide the pallet 10, which is moved to one end of the first rail 21, to the other end of the first rail 21.

The pouched-type secondary battery packaging equipment may further include a loading robot 30 that lifts the cell assembly 8 to be seated on the pallet 20.

As illustrated in (b) of FIG. 2, the loading robot 30 may be a pick and place driving robot (P and P robot) that lifts the cell assembly 8 having the side sealing portions 2D and 2E to be seated on the pallet 20.

The loading robot 30 may lift the cell assembly 8 to the pallet 10 disposed in front of a marking printer 40 in the moving direction of the pallet 10. The loading robot 30 may be disposed closer to the other end of the one end and the other end of the first rail 21.

The pouched-type secondary battery packaging equipment may include a marking printer 40 that generates a mark on the cell assembly 8 placed on the pallet 10, a mark reader 50 that reads the mark generated by the marking printer 40, a first meter 60 that measures a weight of the cell assembly 8, an injector 70 having an injection nozzle that injects an electrolyte into the pouch 2 of the cell assembly 8, a second meter 80 that measures a weight of the cell assembly 8, into which the electrolyte is injected, and a sealing unit 90 provided with a vacuum chamber 91, into which the cell assembly 8 is put, and configured to seal the pouch 2.

The pouched-type secondary battery packaging equipment may further include an inspector 100 that inspects the cell assembly 8 sealed by the sealing unit 90.

The inspector 100 may include an IR checker 102 that measures failure of the cell assembly 8 and an inspector reader 104 that reads the mark of the cell assembly 8.

The pouched-type secondary battery packaging equipment may further include an unloading robot 110 that lifts and unloads the cell assembly 8.

The unloading robot 110 may lift the cell assembly 8 from the pallet 10 passing through the inspector 100. The unloading robot 110 may lift and move the cell assembly 8.

As illustrated in FIG. 17, the unloading robot 110 may be the pick and place driving robot (PP robot) that lifts the cell assembly 8 provided with the side sealing portions 2D and 2E and the end sealing portion 2H from the pallet 20 and then unloads the cell assembly 8.

The unloading robot 110 may be disposed closer to one end of the one end and the other end of the first rail 21.

The marking printer 40 may be disposed between a loading robot 30 and the mark reader 50 in the moving direction of the pallet 10.

The mark reader 50 may be disposed between the marking printer 40 and the first meter 60 in the moving direction of the pallet 10.

The first meter 60 may be disposed between the mark reader 50 and the injector 70 in the moving direction of the pallet 10.

The first meter 60 may measure a weight of the cell assembly 8 before the electrolyte is injected by the injector 70.

The injector 70 may be disposed between the first meter 60 and the second meter 80 in the moving direction of the pallet 10.

The second meter 80 may measure a weight of the cell assembly 8 including the electrolyte after the electrolyte is injected by the injector 70. The second meter 80 may be disposed between the injector 70 and the sealing unit 90 in the moving direction of the pallet 10.

The sealing unit 90 may be a unit that bonds the peripheral portion 2G of the opposite side 2F of the folding line of the pouch 2 as illustrated in (d) of FIG. 2.

The marking printer 40, a mark reader 50, the first meter 60, the injector 70, the second meter 80, and the sealing unit 90 may be sequentially disposed along the pallet rail 20.

The loading robot 30 may be disposed around the first rail 21 and may be disposed in front of the marking printer 40 in the moving direction of the pallet 10.

The marking printer 40, the mark reader 50, the first meter 60, the injector 70, the second meter 80, and the sealing unit 90 may be disposed in a lone along the first rail 21.

The marking printer 40, the mark reader 50, the first meter 60, the injector 70, the second meter 80, and the sealing unit 90 may be sequentially disposed around the first rail 21 along the first rail 21.

The inspector 100 may be disposed around the first rail 21 and may be disposed behind the sealing unit 90 in the moving direction of the pallet 10.

The unloading robot 110 may be disposed around the first rail 21 and may be disposed behind the inspector 100 in the moving direction of the pallet 10.

Figure 4:
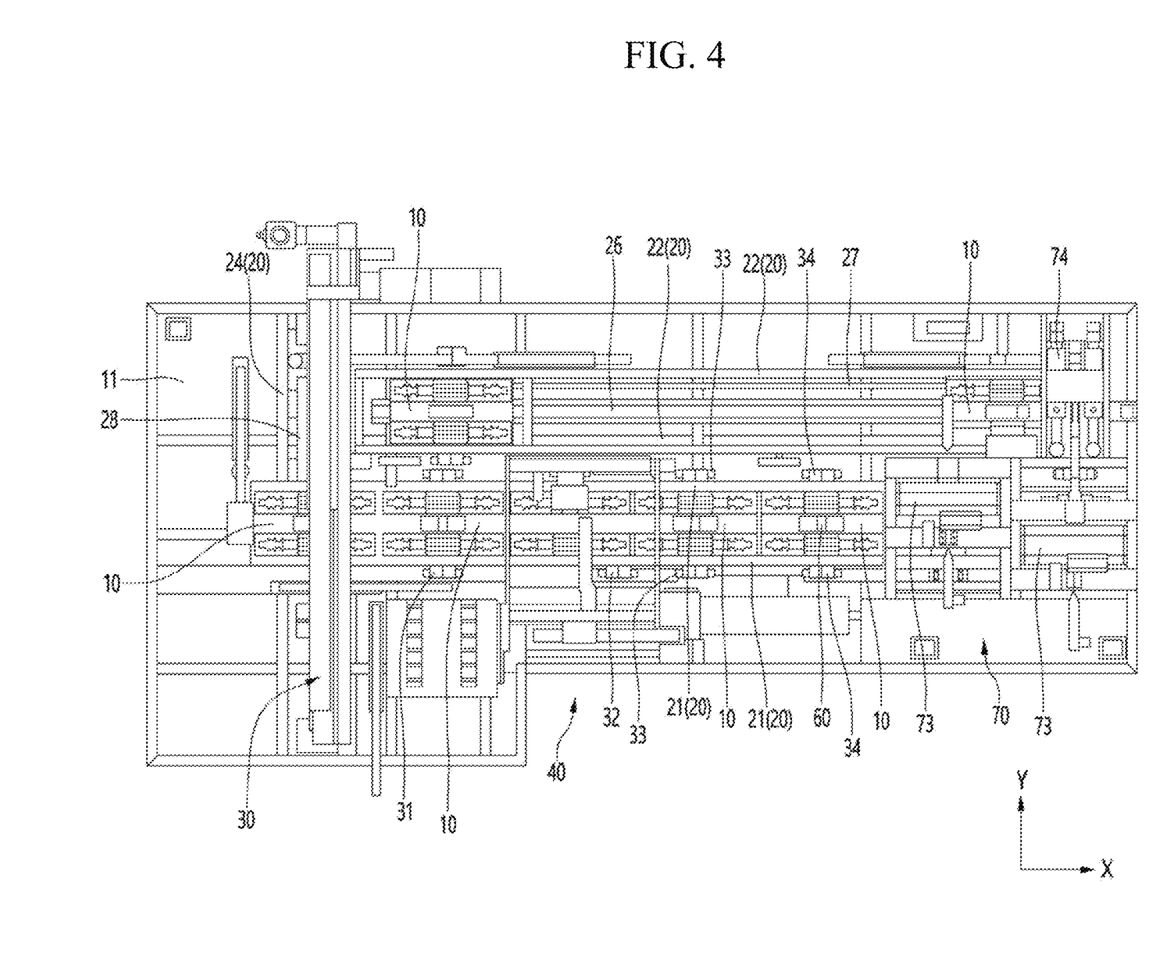
FIG. 4 is a plan view of a portion A illustrated in FIG. 3.
Figure 5:
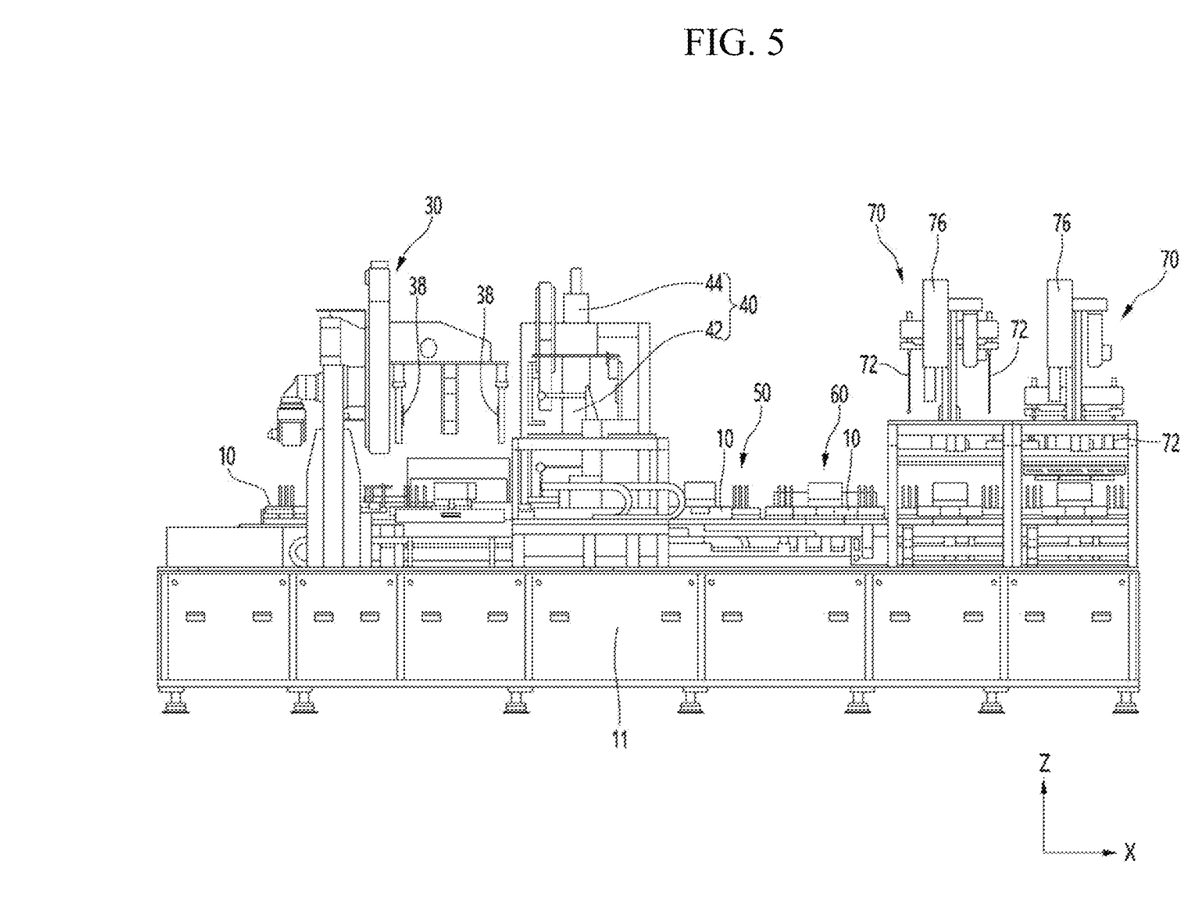
FIG. 5 is a side view of the portion A illustrated in FIG. 3.
Figure 6:
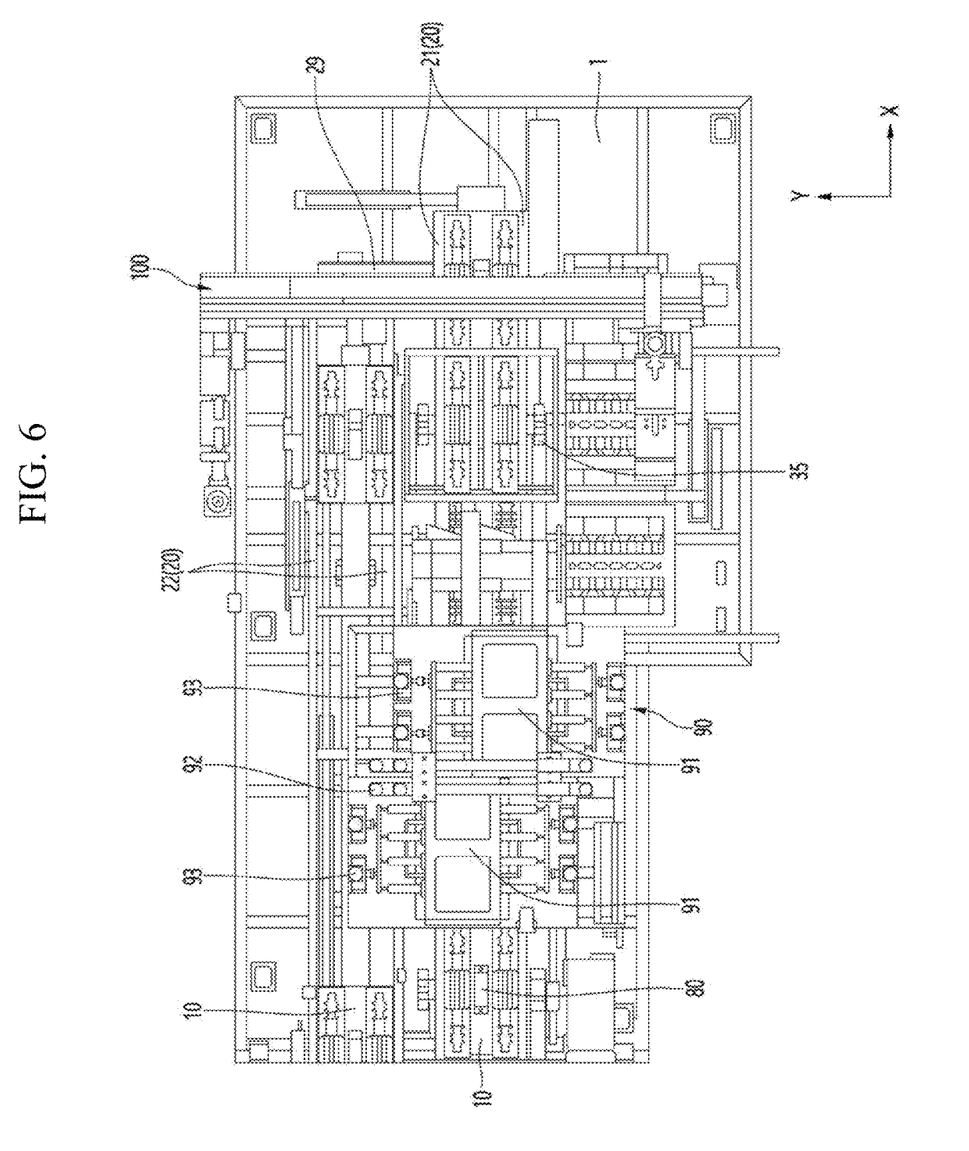
FIG. 6 is a plan view of a portion B illustrated in FIG. 3.
Figure 7:
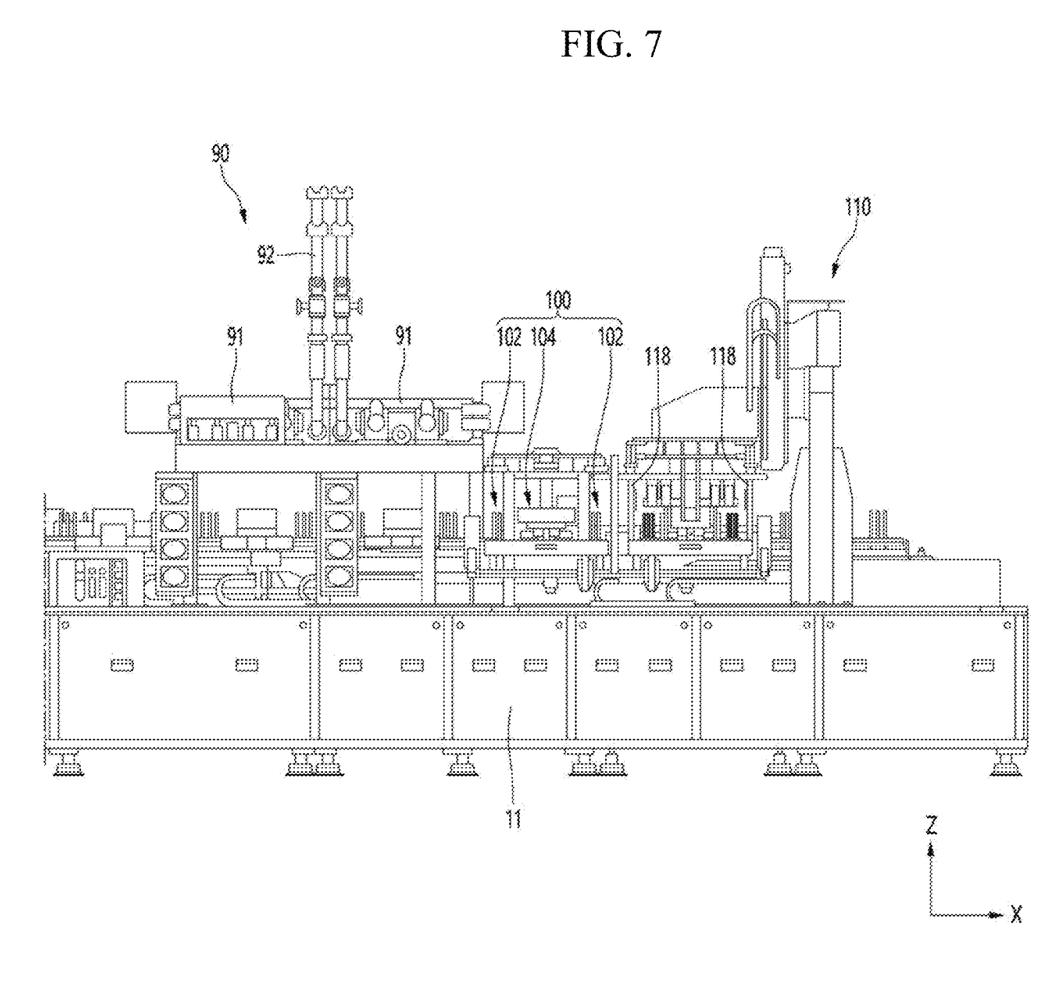
FIG. 7 is a side view of the portion B illustrated in FIG. 3.

FIG. 4 is a plan view of a portion A illustrated in FIG. 3, FIG. 5 is a side view of the portion A illustrated in FIG. 3, FIG. 6 is a plan view of a portion B illustrated in FIG. 3, and FIG. 7 is a side view of the portion B illustrated in FIG. 3.

The pouched-type secondary battery packaging equipment may include a pallet driving robot 26 (see FIG. 4) that moves the pallet 10. The pallet driving robot 26 may be disposed on the worktable 11 so as to be disposed around the rail 20. The pallet driving robot 26 may linearly move the pallet 10 around the rail 20.

The pallet driving robot 26 may be provided for each of the first rail 21 and the second rail 22.

The pallet driving robot 26 may linearly move the pallet 10 and also may move the pallet 10 to each process position.

The pallet driving robot 26 may linearly move the pallet 10 so that the pallet 10 moves along the first rail 21 or moves along the second rail 22. The pallet driving robot 26 may include a driving source such as a servo motor or a cylinder and at least one power transmission member that transmits driving force of the driving source to the pallet 10 between the driving source and the pallet 10. The power transmission member may include a chain, a cable, and a cableveyor 27 (see FIG. 4) that are connected to the pallet 10 to linearly move the pallet 10.

The pouched-type secondary battery packaging equipment may further include at least one pallet shift robot (see reference numeral 28 in FIG. 4 and reference numeral 29 in FIG. 6) that shifts the pallet 10.

The pallet shift robots 28 and 29 may be provided in a pair, and the pair of pallet shift robots 28 and 29 may include a first pallet shift robot 28 (see FIG. 4) that shifts the pallet 10, which is disposed on the second rail 22, above the first rail 21 and a second pallet shift robot 29 (see FIG. 6) that shifts the pallet 10, which is disposed on the first rail 21, above the second rail 22.

The loading robot 30 illustrated in FIGS. 4 and 5 may be disposed adjacent to the fourth rail 24. Various robots may be applied to the loading robot 30. For example, the loading robot 30 may include an orthogonal robot including three slides having X, Y, and Z axes perpendicular to each other.

As illustrated in FIG. 4, the loading robot 30 may be disposed to be elongated in a direction Y orthogonal to the longitudinal direction X of the rail 20 as a whole.

The loading robot 30 may include a plurality of chucks 38 (see FIG. 5) capable of holding the cell assembly 8, and the loading robot 30 may move the plurality of chucks 38 to the X, Y, and Z axes.

The pouched-type secondary battery packaging equipment may further include at least one pallet fixing pusher 31, 32, 33, 34, and 35 capable of pressing the pallet 10 to fix the pallet 10 to a working position.

The pallet fixing pushers 31, 32, 33, 34 and 35 may be disposed on the worktable 11.

The pallet fixing pushers 31, 32, 33, 34, and 35 may be disposed around the first rail 21 and may include a pressing member that presses the pallet 10 and a driving source such as a cylinder or motor, which operates the pressing member.

The plurality of pallet fixing pushers 31, 32, 33, 34 and 35 may include the pallet fixing pusher 31 (see FIG. 4) disposed between the loading robot 30 and the marking printer 40.

The plurality of pallet fixing pushers 31, 32, 33, 34 and 35 may include the pallet fixing pusher 32 (see FIG. 4) disposed between the pallet 10 and the marking printer 40. The pallet fixing pusher 32 may be disposed to be disposed inside the marking printer 40.

The plurality of pallet fixing pushers 31, 32, 33, 34, and 35 may include the pallet fixing pusher 33 (see FIG. 4) disposed around the mark reader 50 to fix the pallet 10 to a reading position. Here, the reading position may be a position at which the mark reader 50 reads the mark formed on the cell assembly 8.

The plurality of pallet fixing pushers 31, 32, 33, 34, and 35 may include the pallet fixing pusher 35 (see FIG. 6) that fixes the pallet 10 to a position at which the unloading robot 110 is capable of holding the cell assembly 8.

The plurality of pallet fixing pushers 31, 32, 33, 34, and 35 may include the pallet fixing pusher 35 (see FIG. 6) that fixes the pallet 10 to a position at which the unloading robot 100 is capable of holding the cell assembly 8.

The plurality of pallet fixing pushers 31, 32, 33, 34, and 35 may the position of the pallet 10 at each working position and is not limited to the number thereof.

The marking printer 40 may be disposed on the worktable 11.

The marking printer 40 may print a barcode for tracking information of the cell assembly 8 on the cell assembly 8.

The marking printer 40 may include a barcode printer 42 (see FIG. 5) that generates a mark such as a barcode on the cell assembly 8.

A barcode printer may print a barcode on an outer surface of the cell assembly 8 moved between the first rail 21 and the barcode printer.

The marking printer 40 may further include a printer driving robot 44 that drives the barcode printer 42. The printer driving robot 44 may be a robot that moves a nozzle of the barcode printer 42 to the cell assembly 8.

The mark reader 50 may include a barcode reader (or barcode sensor) capable of sensing the barcode formed by the marking printer 40 and may include an image sensor or the like.

The mark reader 50 may sense the barcode to transmit information of the cell assembly 8 to a controller (not shown). The sensing result of the mark reader 50 may be transmitted to the controller.

The first meter 60 may be disposed on the worktable 11.

The first meter 60 may include a weight meter capable of measuring a weight of the cell assembly 8 before injecting the electrolyte into the cell assembly 8. The measurement result of the first meter 60 may be transmitted to the controller.

The injector 70 may be disposed on the worktable 11.

The injector 70 may include an injection nozzle 72 (see FIG. 5). The injection nozzle 72 may inject the electrolyte into the pouch 2 of the cell assembly 8.

The injector 70 may further include an electrolyte receiver 73 (see FIG. 4).

The electrolyte receiver 73 may be disposed on the worktable 11. The electrolyte receiver 73 may receive the electrolyte dropped from the injector 70 or the cell assembly 8.

The injector 70 may further include an injection pump 74 (see FIG. 4) that pumps the electrolyte to the injection nozzle 72. The injection pump 74 may be directly connected to the injection nozzle 72 or may be connected to the injection nozzle 72 through a separate injection tube. When the injection pump 74 is driven, the electrolyte may be supplied to the injection nozzle 72, and the injection nozzle 72 may inject the electrolyte into the pouch 2.

The injector 70 may include an injection nozzle driving robot 76 (see FIG. 5) capable of moving the injection nozzle 72. The injection nozzle driving robot 76 may move the injection nozzle 72 in the X, Y, and Z axes. The injection nozzle driving robot 76 may move the injection nozzle 72 to an injection position.

After the injection nozzle 72 is moved to the injection position, the injection pump 74 may be driven, and the injection nozzle 72 may inject the electrolyte into the pouch 2 at the injection position.

The second meter 80 may include a weight meter capable of measuring a weight of the cell assembly 8 including the electrolyte after the electrolyte is injected into the cell assembly 8. The measurement result of the second meter 80 may be transmitted to the controller.

When the weight measured by the first meter 60 is subtracted from the weight measured by the second meter 80, an amount of electrolyte actually injected into the pouch 2 may be calculated.

The sealing unit 90 may be disposed on the worktable 11.

The sealing unit 90 may include a vacuum chamber 91 (see FIGS. 6 and 7) having a space defined therein and also include a vacuum pipe 92 (see FIGS. 6 and 7) connected to the vacuum chamber 91. The vacuum pipe 92 may be connected to a vacuum former (not shown) such as a compressor.

The sealing unit 90 may heat the pouch 2 using a sealing tool such as a sealing heater, and the bonding layer 2B constituting the pouch 2 may be melted by heat transferred from the sealing tool to the pouch 2, and thus, the end sealing portion 2H may be provided on the pouch 2.

The sealing unit 90 may further include a driving cylinder 93 (see FIG. 6) capable of moving the sealing tool, and the driving cylinder 93 may allow the sealing tool to be accessible to the pouch 2. When the end sealing portion 2H is completely formed, the sealing tool may be retracted from the pouch 2.

The inspector 100 may include a pair of IR checkers 102 as illustrated in FIG. 7. The inspector reader 104 constituting the inspector 100 may be disposed between the pair of IR checkers 120.

The IR checker 102 may include an infrared sensor to sense a state of the cell assembly 8, and the sensing result of the IR checker 102 may be transmitted to the controller.

The inspector reader 104 may include a barcode reader (or barcode sensor) capable of sensing the barcode formed on the cell assembly 8. The sensing result of the inspector reader 104 may be transmitted to the controller.

The unloading robot 110 may be symmetrically disposed with respect to the loading robot 30. The unloading robot 110 may be disposed adjacent to the third rail 23. Various robots may be applied to the unloading robot 111. For example, the unloading robot 110 may be an orthogonal robot including three slides having the X, Y, and Z axes perpendicular to each other.

As illustrated in FIG. 6, the unloading robot 110 may be disposed to be elongated in the direction Y orthogonal to the longitudinal direction X of the rail 20 as a whole.

The unloading robot 110 may include a plurality of chucks 118 (see FIG. 7) capable of holding the cell assembly 8, and the unloading robot 110 may move the plurality of chucks 118 to the X, Y, and Z axes.

The unloading robot 110 may unload the cell assembly 8 from a separate tray (not shown) after holding the cell assembly 8 mounted on the pallet 10.

The pallet 10 from which the cell assembly 8 is separated may be moved to the second rail 22 through the third rail 23 and may be moved along the second rail 22 in a state in which the cell assembly 8 is not seated. Such an empty pallet 10 may be moved back to the first rail 22 through the fourth rail 24, and in a state of being moved to the first rail 22, a new cell assembly may be loaded from the loading robot 30.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present invention is to be considered illustrative, and not restrictive, and the technical spirit of the present disclosure is not limited to the foregoing embodiment.

Therefore, the scope of the present invention is defined not by the detailed description of the invention but by the appended claims, and all differences within the scope will be construed as being included in the present invention.

The invention claimed is:

1. Pouched-type secondary battery packaging equipment comprising:
a pallet on which a cell assembly, in which a cell is accommodated inside a pouch, is placed;

a loading robot configured to lift the cell assembly to be seated on the pallet;
a pallet rail along which the pallet is guided;
a marking printer configured to generate a mark on the cell assembly placed on the pallet;
a mark reader configured to read the mark generated by the marking printer;
a first meter configured to measure a weight of the cell assembly;
an injector provided with an injection nozzle configured to inject an electrolyte into the pouch of the cell assembly;
a second meter configured to measure a weight of the cell assembly having the electrolyte injected thereinto;
a sealer provided with a vacuum chamber, into which the cell assembly is put, and configured to seal the pouch;
an inspector configured to inspect the cell assembly sealed by the sealer; and
an unloading robot configured to lift and unload the cell assembly,
wherein the pallet rail comprises:
 a first rail and a second rail, the first rail and the second rail being parallel to each other;
 a third rail connecting a second end of the first rail to a second end of the second rail; and
 a fourth rail connecting a first end of the first rail to a first end of the second rail, wherein the marking printer, the mark reader, the first meter, the injector, the second meter, the sealer, and the inspector are sequentially disposed in a line along the first rail from the first end to the second end,
wherein the unloading robot is configured to unload the cell assembly from the pallet located after the inspector,
wherein the unloading robot is disposed closer to the second end of the first rail than the first end of the first rail,
wherein the loading robot is configured to lift the cell assembly to the pallet disposed before the marking printer, and
wherein the loading robot is disposed closer to the first end of the first rail than the second end of the first rail.

2. The pouched-type secondary battery packaging equipment according to claim 1, further comprising a worktable on which the pallet rail is disposed,
wherein the first rail and the second rail are disposed to be elongated in a longitudinal direction of the worktable.

3. The pouched-type secondary battery packaging equipment according to claim 1, wherein each of a length of the first rail and a length of the second rail is greater than each of a length of the third rail and a length of the fourth rail.

4. The pouched-type secondary battery packaging equipment according to claim 1, wherein the inspector comprises:
an IR checker configured to identify a defect of the cell assembly, the IR checker being configured to sense an appearance state of the cell assembly; and
an inspector reader configured to read the mark of the cell assembly.

* * * * *